(12) United States Patent
Goh

(10) Patent No.: US 10,953,854 B2
(45) Date of Patent: Mar. 23, 2021

(54) WIPER BLADE ADAPTER ASSEMBLY

(71) Applicant: GOS CO. LTD., Gyeongsangbuk-do (KR)

(72) Inventor: Su Yeun Goh, Gyeongsangbuk-do (KR)

(73) Assignee: GOS CO. LTD., Gyeongsangbuk-do (KR)

( * ) Notice: Subject to any disclaimer, the term of this patent is extended or adjusted under 35 U.S.C. 154(b) by 159 days.

(21) Appl. No.: 16/066,775

(22) PCT Filed: Dec. 28, 2015

(86) PCT No.: PCT/KR2015/014305
§ 371 (c)(1),
(2) Date: Sep. 7, 2018

(87) PCT Pub. No.: WO2017/115882
PCT Pub. Date: Jul. 6, 2017

(65) Prior Publication Data
US 2019/0077375 A1    Mar. 14, 2019

(51) Int. Cl.
*B60S 1/40* (2006.01)
*B60S 1/38* (2006.01)
*B60S 1/34* (2006.01)

(52) U.S. Cl.
CPC .............. *B60S 1/4019* (2013.01); *B60S 1/34* (2013.01); *B60S 1/38* (2013.01); *B60S 1/40* (2013.01);
(Continued)

(58) Field of Classification Search
CPC ...... B60S 1/4003; B60S 1/4067; B60S 1/407; B60S 1/4074; B60S 1/4077; B60S 1/4006;
(Continued)

(56) References Cited

U.S. PATENT DOCUMENTS

| 2012/0110773 A1* | 5/2012 | Thielen | B60S 1/3849 |
| | | | 15/250.32 |
| 2012/0144615 A1* | 6/2012 | Song | B60S 1/4003 |
| | | | 15/250.32 |
| 2013/0139343 A1* | 6/2013 | Kim | B60S 1/4006 |
| | | | 15/250.32 |

FOREIGN PATENT DOCUMENTS

| CN | 204488738 U | 7/2015 |
| DE | 202012102614 U1 * | 10/2012 |
| KR | 20110112793 A | 10/2011 |

(Continued)

OTHER PUBLICATIONS

International Search Report from International Patent Application No. PCT/KR2015/014305 dated Sep. 27, 2016 and English translation of same.
(Continued)

*Primary Examiner* — Gary K. Graham
(74) *Attorney, Agent, or Firm* — Studebaker & Brackett PC

(57) ABSTRACT

Disclosed is an adapter assembly coupled to a clamp of the center of a wiper, configured by providing an arm-coupling adapter of which the lower part is coupled to a center base cover by a hinge so as to allow the adapter to freely rotate at a predetermined angle, the upper part has a hook arm assembling part, which enables a hook arm bent in a hook shape to be fit-assembled thereto, and the center part has an arm pin assembling groove penetrated in the longitudinal direction; and additionally assembling, at the rear side of the arm-coupling adapter, a rear top clip member for covering a portion of the rear of the adapter and, simultaneously, uniformly pressing the upper part of the arm when the hook arm or a side lock arm is coupled, such that the clip member prevents separation and ensures stable positioning.

3 Claims, 12 Drawing Sheets

(52) U.S. Cl.
CPC ............ *B60S 1/4003* (2013.01); *B60S 1/407* (2013.01); *B60S 1/4016* (2013.01); *B60S 1/4048* (2013.01); *B60S 1/4074* (2013.01); *B60S 1/3867* (2013.01); *B60S 2001/4022* (2013.01); *B60S 2001/4035* (2013.01)

(58) Field of Classification Search
CPC .................. B60S 1/4009; B60S 1/4045; B60S 2001/4022; B60S 2001/4035; B60S 2001/4025; B60S 2001/4061; B60S 2001/4058; B60S 2001/4051; B60S 1/4048; B60S 1/4016; B60S 1/40; B60S 1/4019
USPC ...................................................... 15/250.32
See application file for complete search history.

(56) References Cited

FOREIGN PATENT DOCUMENTS

| | | |
|---|---|---|
| KR | 20120066208 A | 6/2012 |
| KR | 101381152 B1 | 4/2014 |
| KR | 20140134240 A | 11/2014 |
| WO | 201501689 A1 | 10/2015 |

OTHER PUBLICATIONS

Written Opinion from International Patent Application No. PCT/KR2015/014305 dated Sep. 27, 2016.
European Search Report for related European Application No. 15912118.5; action dated Jul. 8, 2019; (5 pages).

\* cited by examiner

WIPER BLADE ADAPTER ASSEMBLY

CROSS REFERENCE TO RELATED APPLICATIONS

The present application is a National Stage of International Application No. PCT/KR2015/014305, filed on Dec. 28, 2015, the entire content of which is incorporated herein by reference.

TECHNICAL FIELD

The present disclosure relates to an adapter assembly coupled to a clamp at the center of a wiper blade so as to easily couple arms, and more particularly, to a novel wiper blade adapter assembly which can be effectively used for various types of arms and is greatly helpful for arm coupling convenience, a detachment prevention function after coupling, and establishment of stability and a binding force.

BACKGROUND ART

A wiper blade (or a wiper device) for wiping off foreign matter (rainwater, snow, dust, etc.) adhering to a surface of a glass window while rotating (turning) with a predetermined radius according to the operation of a user is required to have an adapter which can be easily coupled to an end of an operating arm connected to a power source of a vehicle so as to enable a rotating (turning) motion with a predetermined radius and can be detached when necessary (for replacement, inspection, etc.).

However, a conventional wiper adapter assembly constructed in a wiper is structured to simply couple a "⊏"-shaped hook arm or a side lock arm without a particular element.

Therefore, not only vibrations or shakes and malicious noise are generated during a wiping operation, but also stability of the arm is significantly undermined because an upper surface of the arm is exposed to the outside.

Even if a portion of the arm is exposed to the outside and noise is generated during the wiping operation, there is no particular problem in a basic wiping operation. However, after a certain period of time elapses, portions in close contact with each other may wear and have cracks. Thus, a failure and breakage rate may be increased while the service life is greatly shortened. Furthermore, the increased vehicle noise may deteriorate the quality or performance of a vehicle, thereby reducing reliability. In this regard, improvement is urgently required.

DISCLOSURE

Technical Problem

Aspects of the present disclosure provide a novel wiper blade adapter assembly which ensures exterior safety by minimizing the exposure of a "⊏"-shaped hook arm or a side lock arm to the outside when the arm is coupled to an arm-coupling adapter installed in a vehicle wiper device and, at the same time, greatly contributes to the function and quality of a wiper by providing a highly reliable binding force for preventing detachment.

Technical Solution

According to an aspect of the present disclosure, there is provided an arm-coupling adapter assembly A installed in a wiper blade and configured by providing an arm-coupling adapter 20 whose lower part is coupled to the center base cover 10 by a hinge 21 to be freely rotatable at a predetermined angle, whose upper part has a hook arm assembling part 22 to which a hook arm bent in a hook-shape can be fit-assembled, and whose central part has an arm pin assembling groove 23 penetrated in a longitudinal direction; and additionally assembling, on a rear side of the arm-coupling adapter 20, a rear top clip member 40 which covers a portion of a rear part of the adapter and, at the same time, uniformly presses an upper part of the hook arm or a side lock arm when the arm is coupled in order to prevent detachment of the arm and ensure stable positioning.

Advantageous Effects

An adapter assembly for a vehicle wiper according the present disclosure greatly helps to prevent detachment of a "⊏"-shaped hook arm, a side lock arm or a pinch tap arm when the arm is coupled to an arm-coupling adapter installed in a vehicle wiper device and, at the same time, enables a more clean finish by minimizing the exposure of the arm to the outside as much as possible and maintains a more stable, strong and highly reliable binding force.

MODE FOR INVENTION

Figure 1:
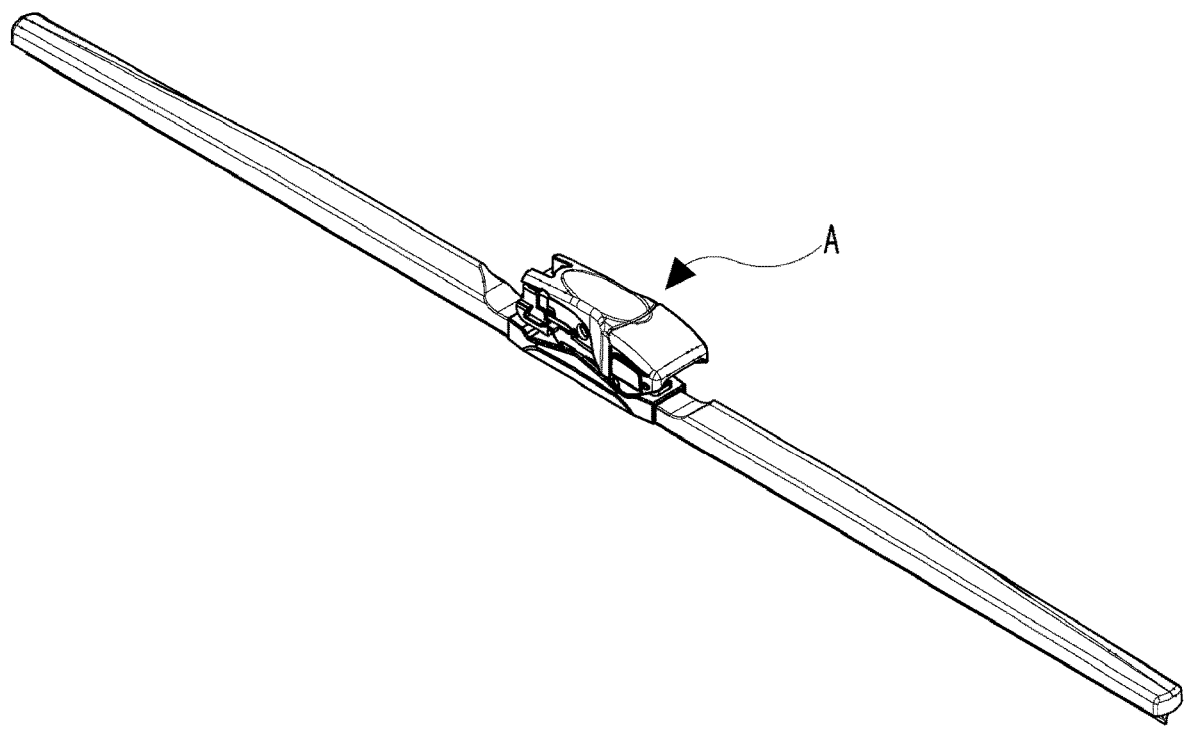
FIG. 1 is a perspective view of an exemplary state of the present disclosure.
Figure 2:
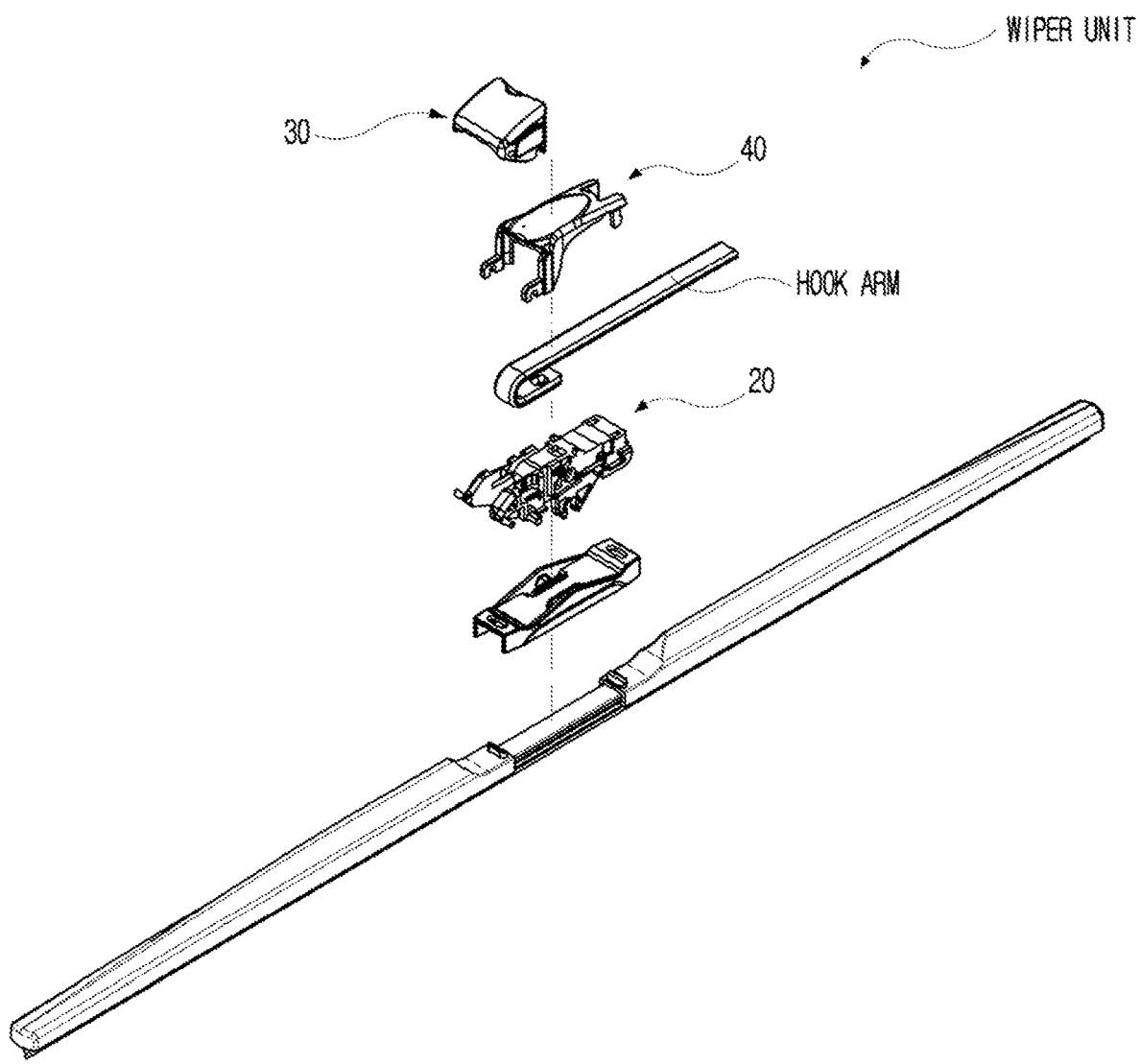
FIG. 2 is an exemplary exploded assembly view of the present disclosure.
Figure 3:
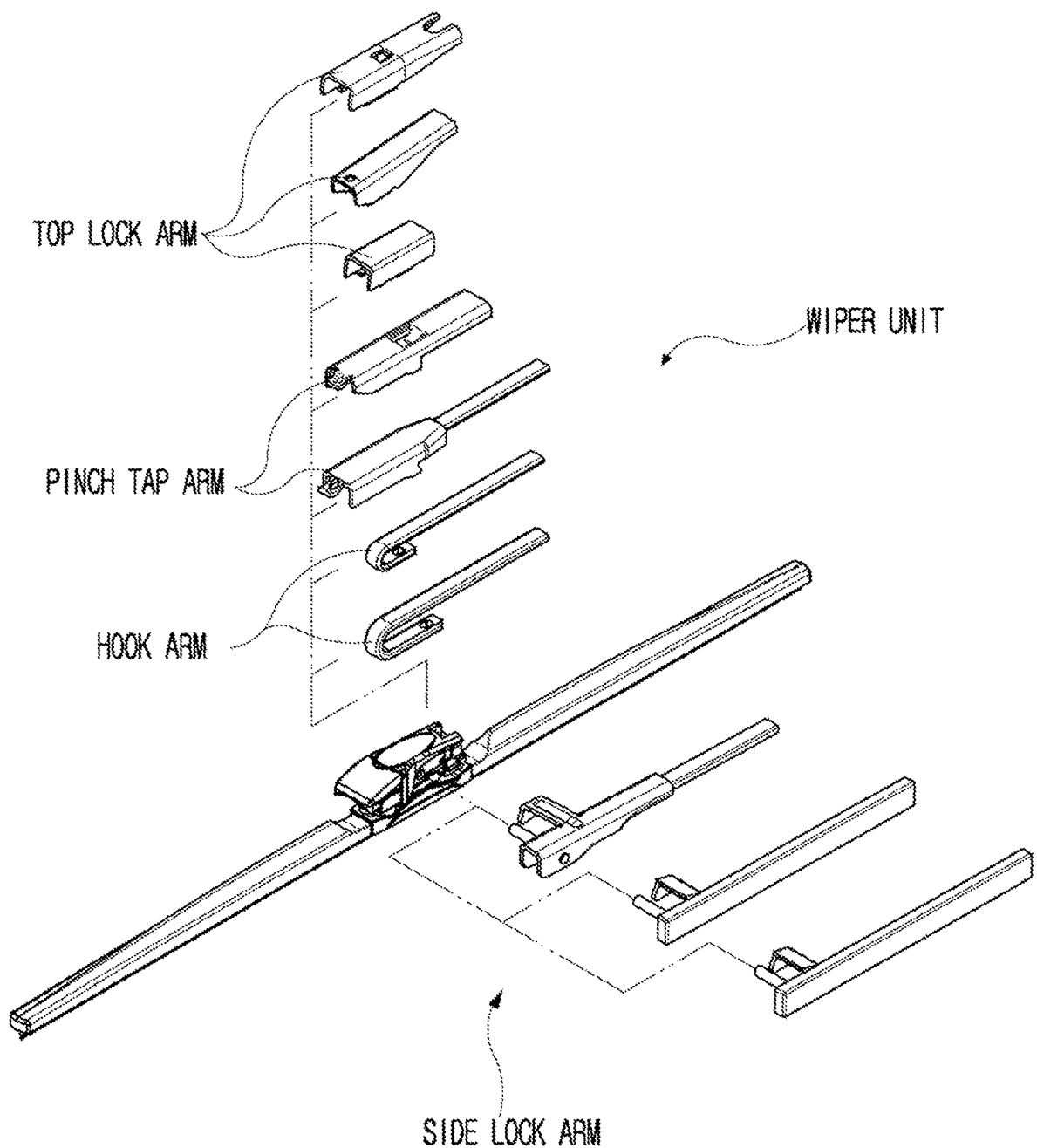
FIG. 3 is an exemplary view showing an application state of the present disclosure.
Figure 4:
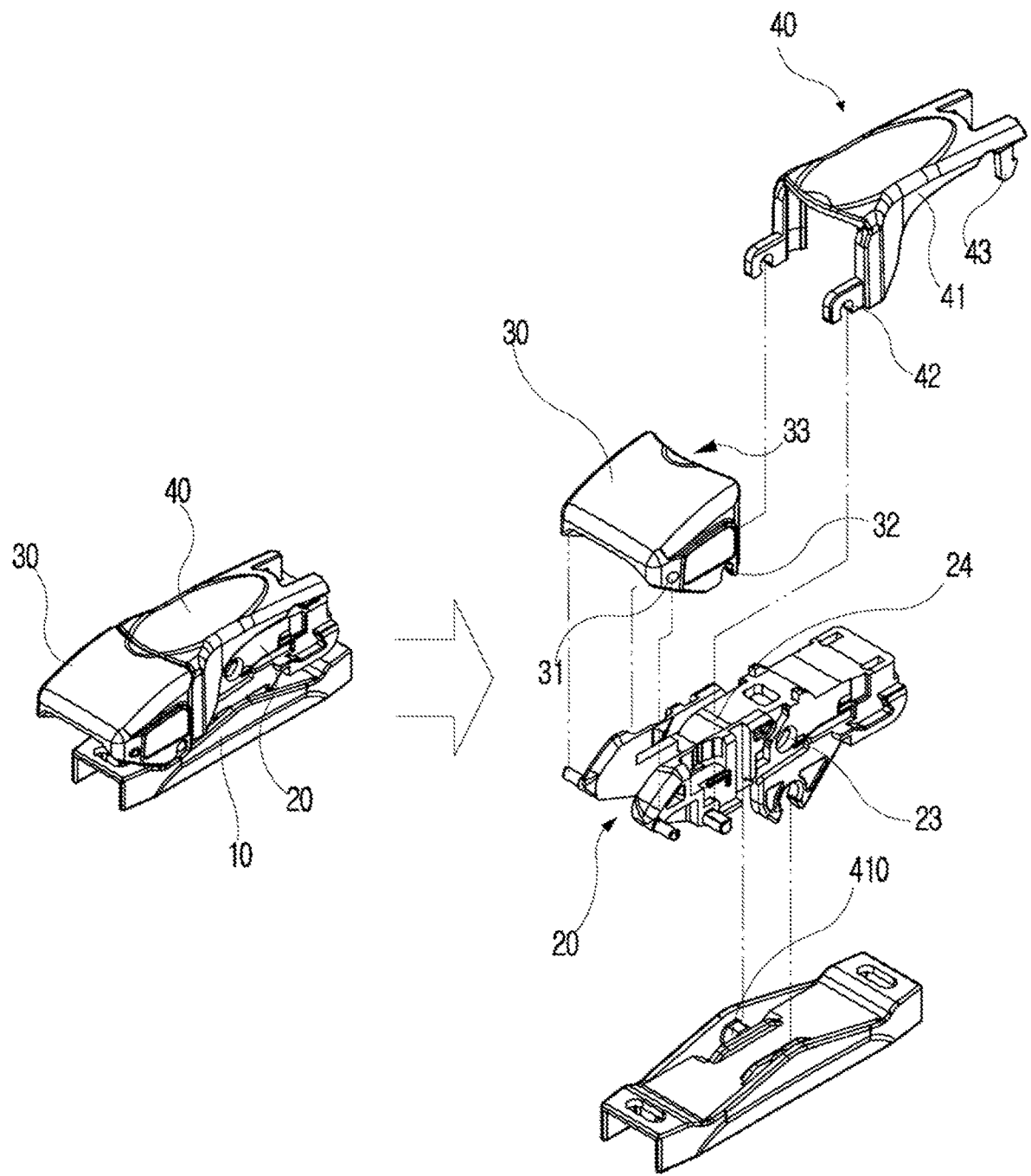
FIG. 4 is an exemplary exploded assembly view of an arm-coupling adapter assembly of the present disclosure.
Figure 5A:
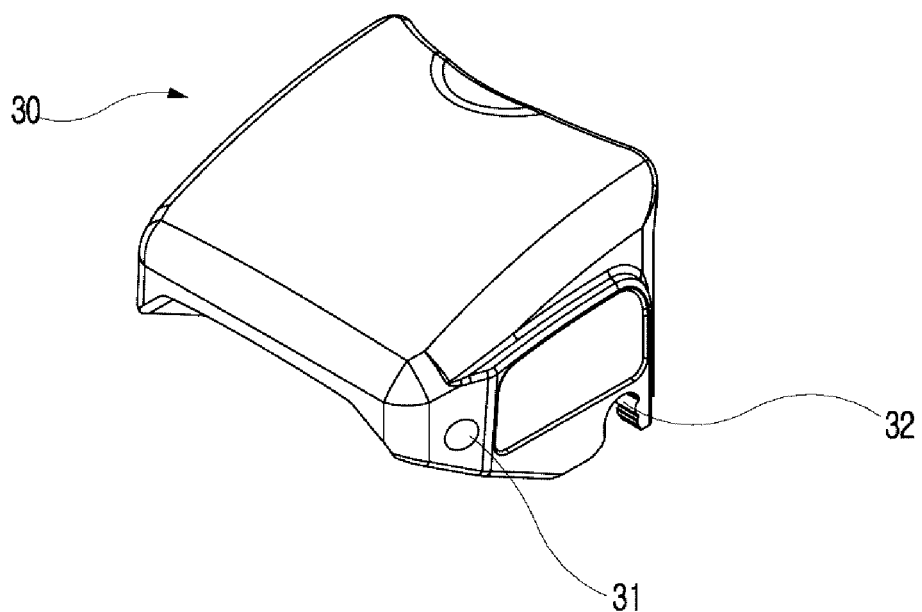
FIGS. 5A and 5B are exemplary enlarged views of a front cap member of the present disclosure.
Figure 5B:
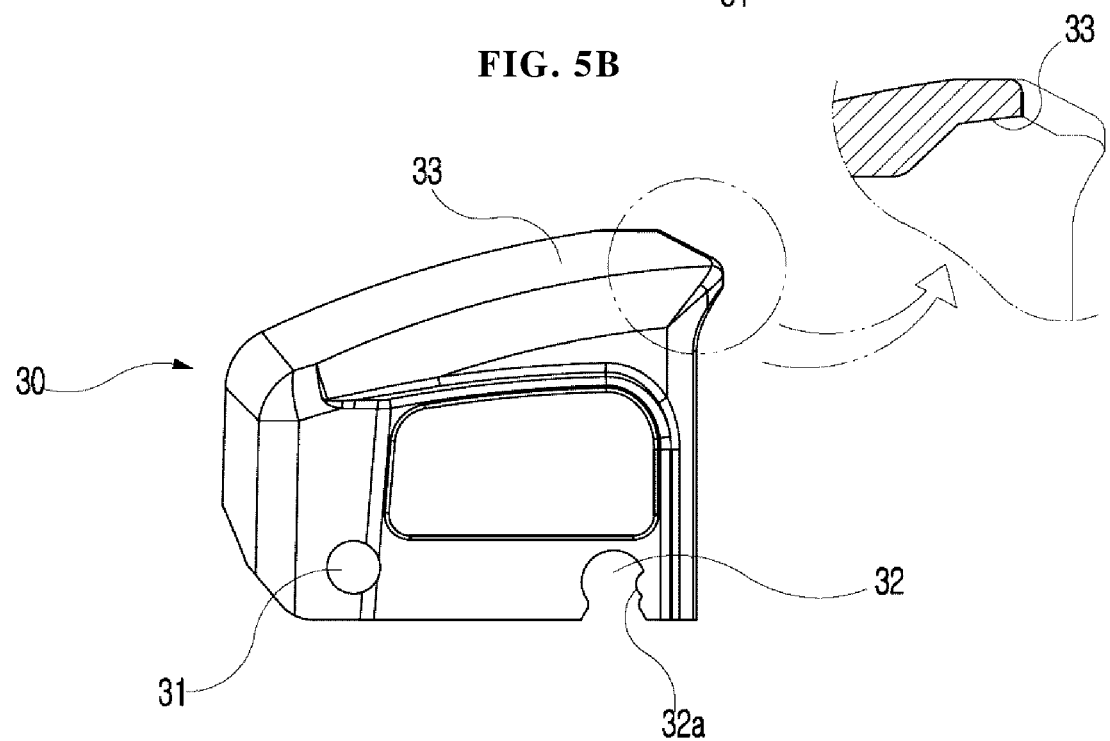
Figure 6A:
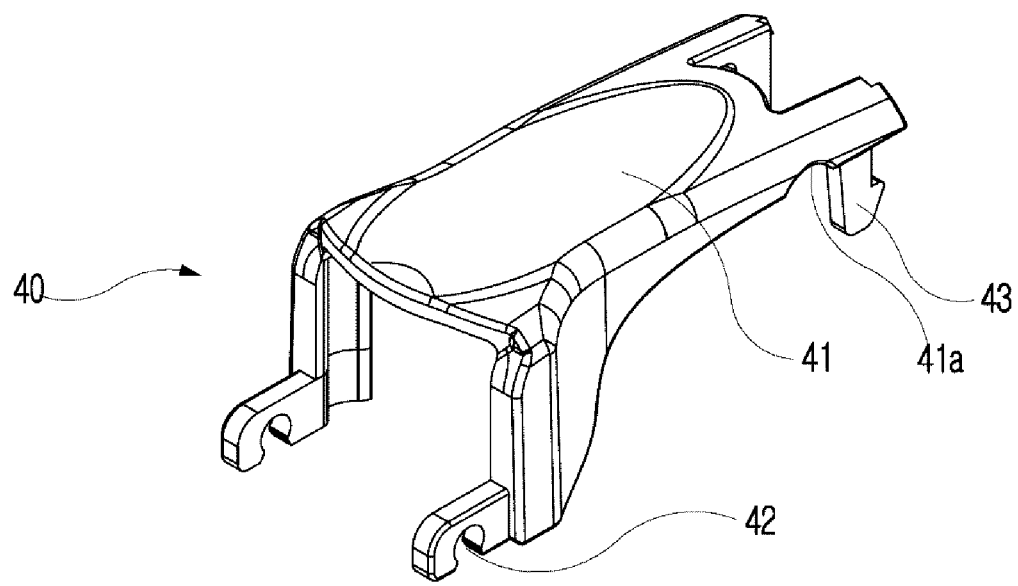
FIGS. 6A and 6B are exemplary enlarged views of a rear top clip member of the present disclosure.
Figure 6B:
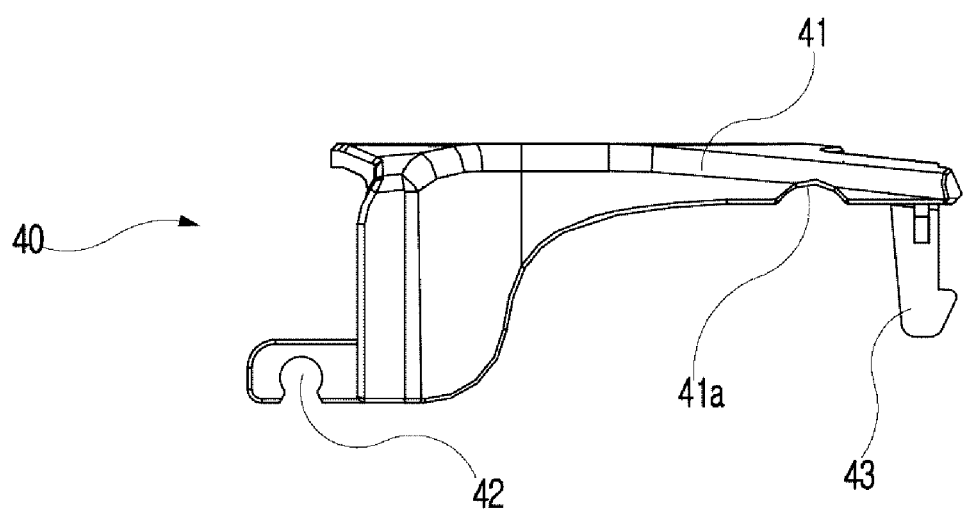
Figure 7:
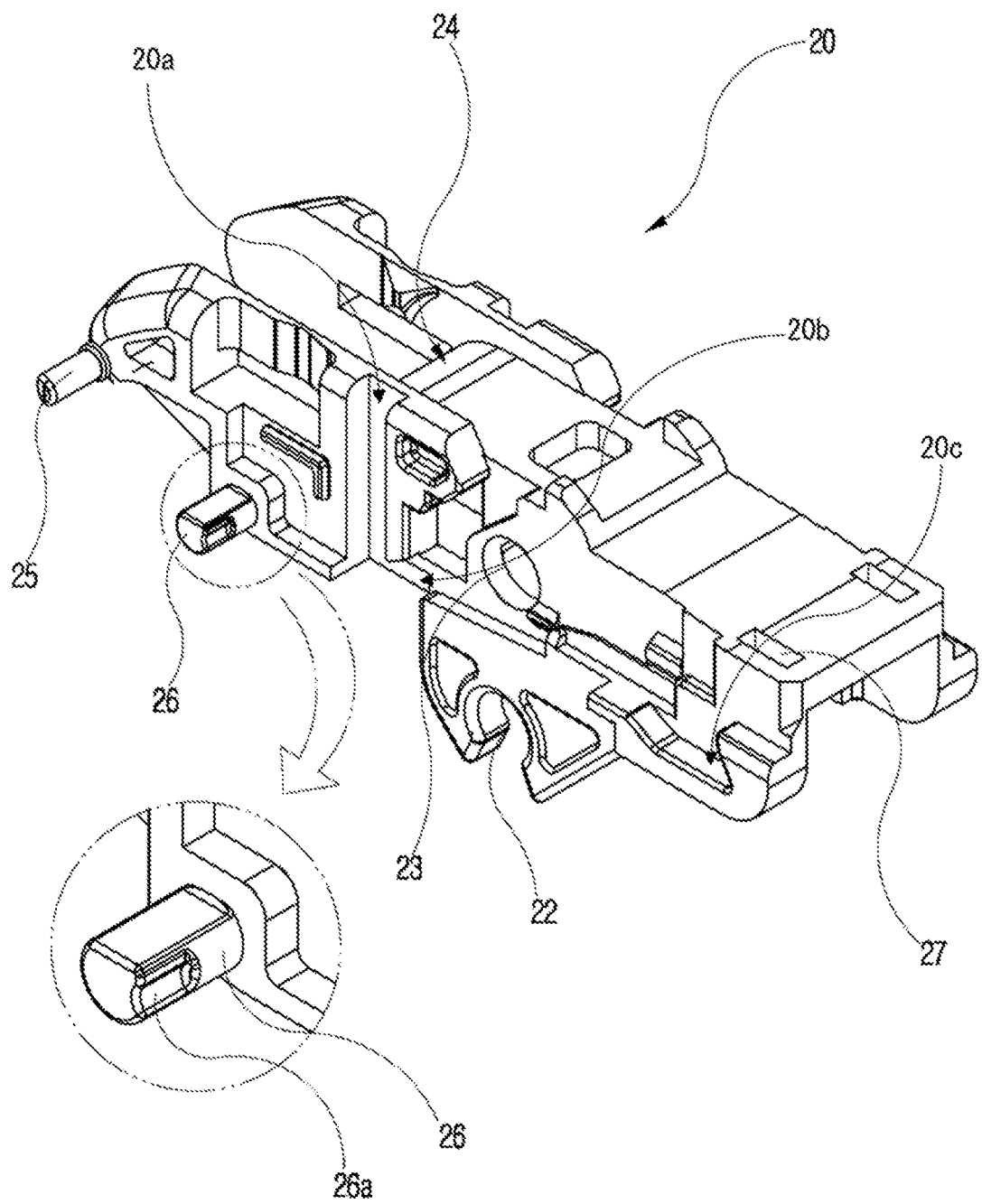
FIG. 7 is an exemplary enlarged perspective view of the arm-coupling adapter of the present disclosure.
Figure 8A:
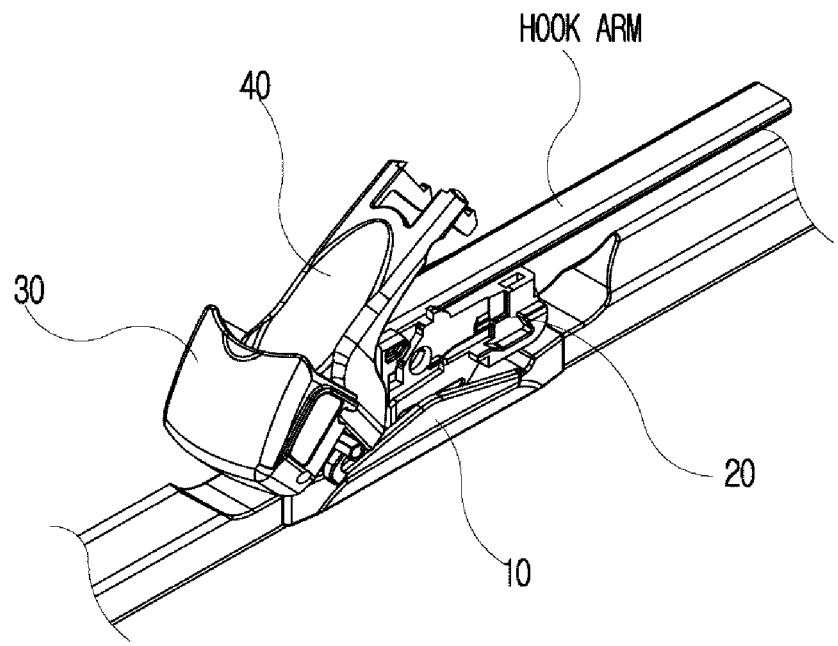
FIGS. 8A and 8B are side views and exemplary coupled views of the arm-coupling adapter of the present disclosure.
Figure 8B:
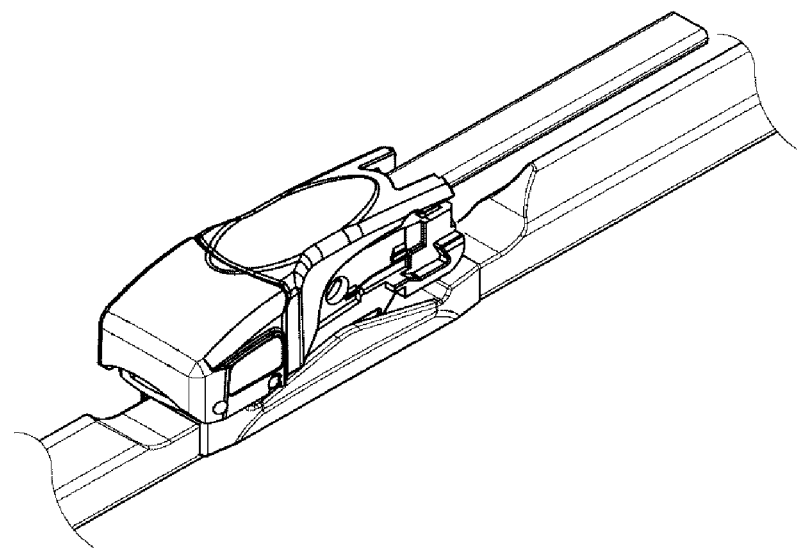
Figure 9A:
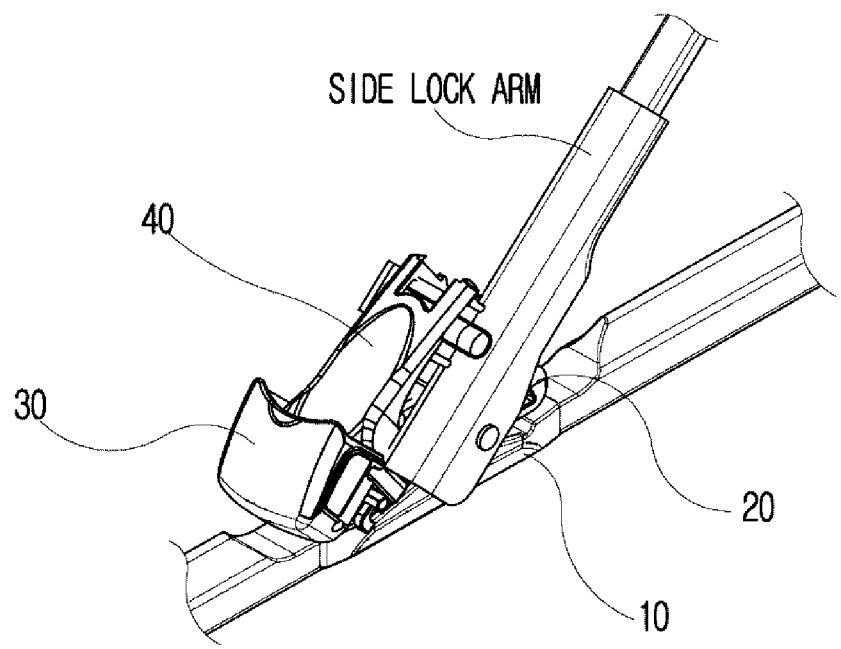
FIGS. 9A through 12B are exemplary views showing assembled states of various arms.
Figure 9B:
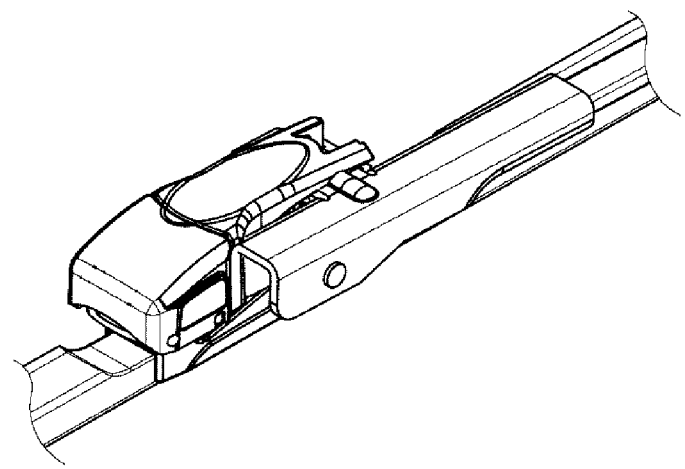
Figure 10A:
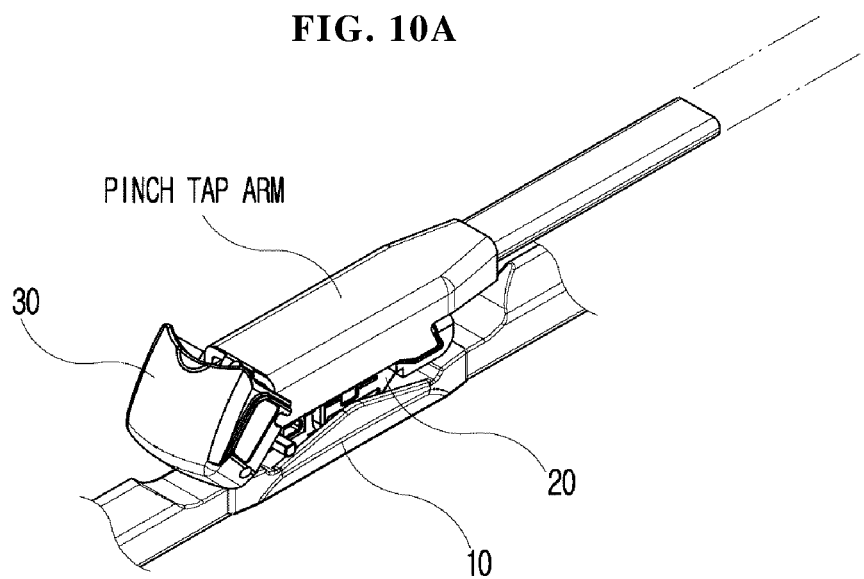
Figure 10B:
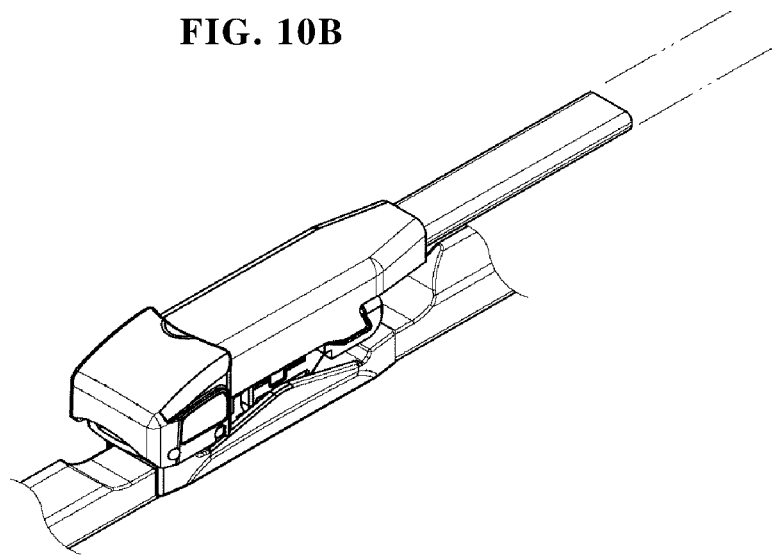
Figure 11A:
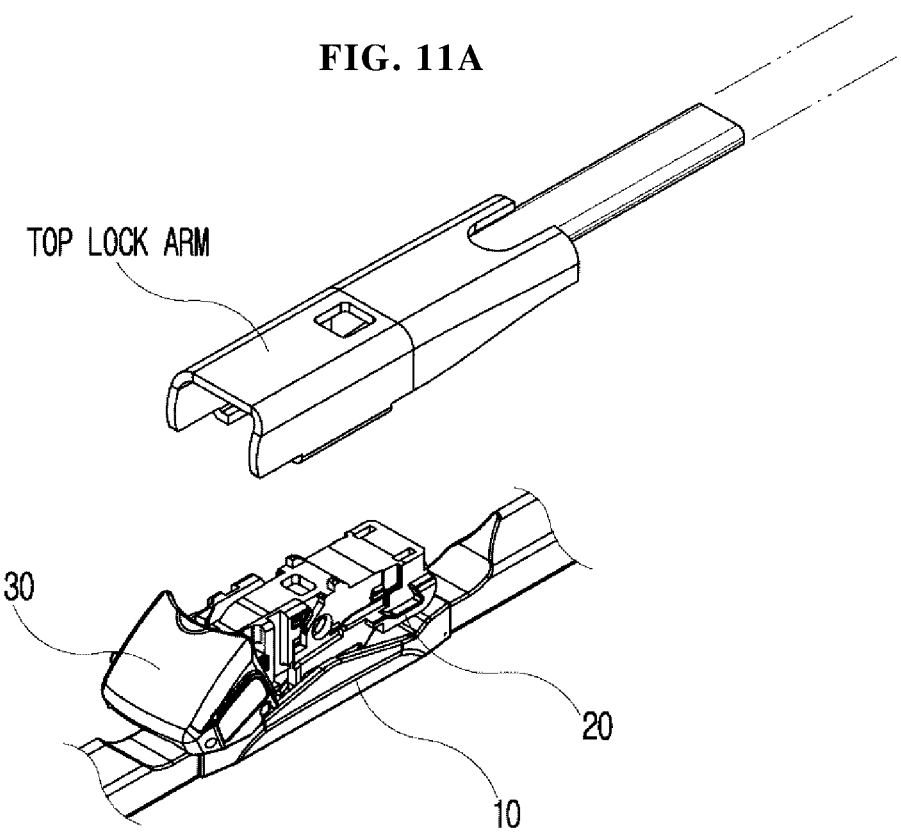
Figure 11B:
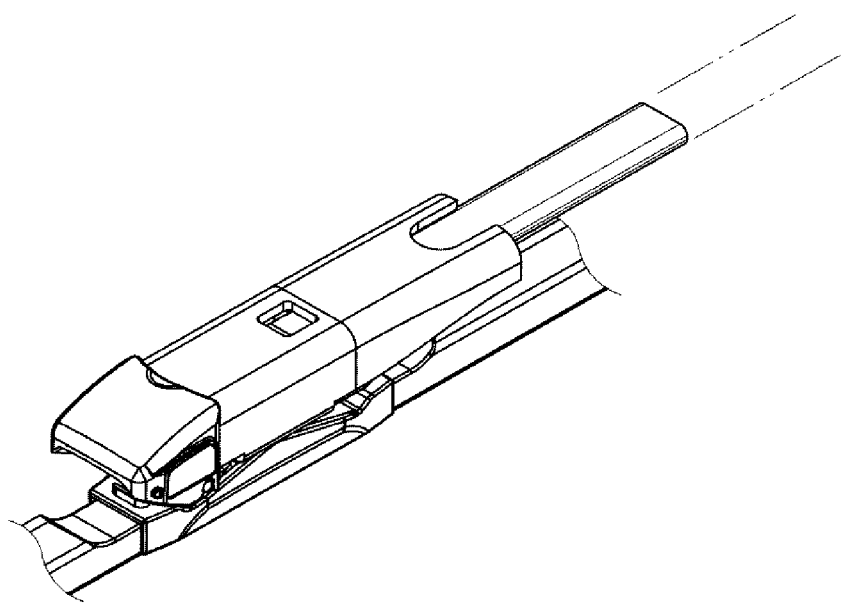
Figure 12A:
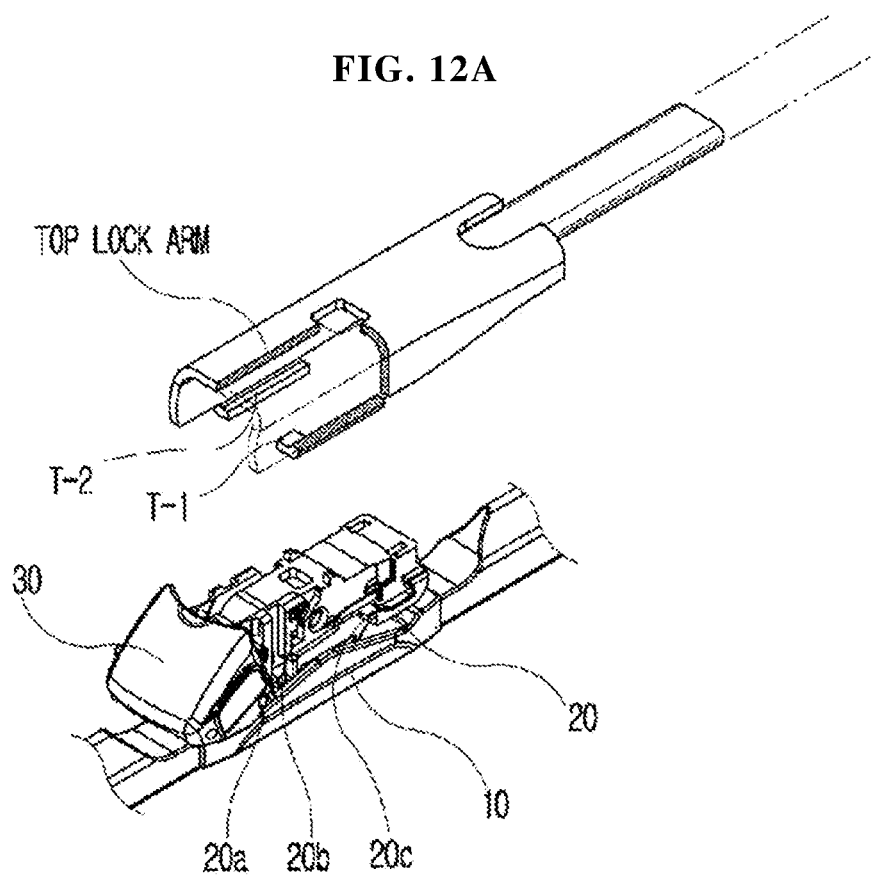
Figure 12B:
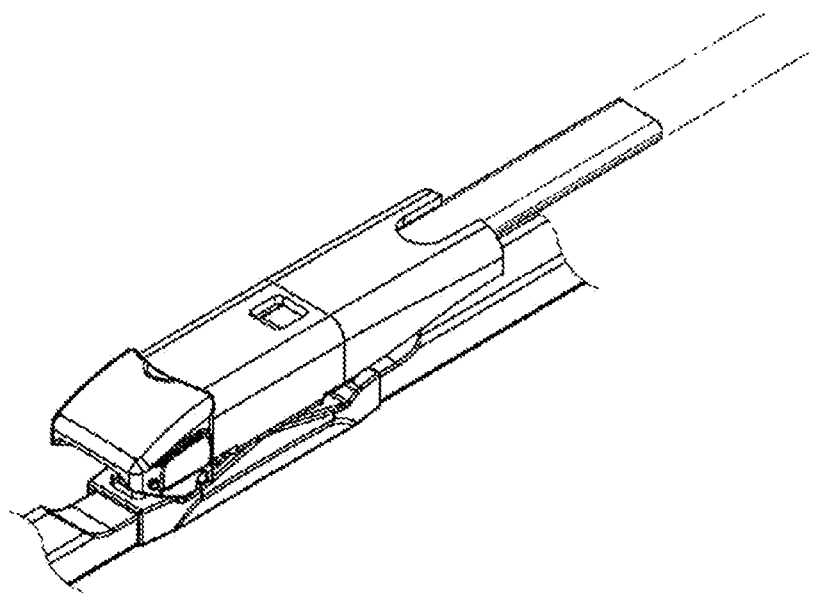

A wiper blade adapter assembly of the present disclosure will now be described in more detail with reference to the accompanying drawings.

That is, the present disclosure relates to an arm-coupling adapter assembly A coupled onto a base cover 10 of a wiper blade device by a hinge and configured by installing, at an upper rear side of the arm-coupling adapter assembly A, a rear top clip member 40 capable of pressing and forcibly fixing a portion of an upper surface of a wiper operating arm coupled to an arm-coupling adapter 20.

A lower part of the arm-coupling adapter assembly A is provided with the arm-coupling adapter 20 which is rotatably coupled to the center base cover 10 by a hinge 21, whose upper part has a hook arm assembling part 22 to which a hook arm bent in a hook-shape can be fit-assembled, and whose central part has an arm pin assembling groove 23 penetrated in a longitudinal direction.

In addition, a front cap member 30 may further be assembled on a front side of the arm-coupling adapter 20 to cover a front part of the adapter and, at the same time, to prevent detachment of a pinch tap arm by pressing an end of an upper side of the pinch tap arm when the pinch tap arm is coupled.

The front cap member 30 has a generally cap-like shape, and hinge coupling grooves 31 coupled to a hinge pin for enabling free rotation are formed at one side of the front cap member 30.

In addition, detachable joining grooves 32 which can be attached or detached by being pushed or pulled with a certain force are formed at another side kept at a predetermined distance from the hinge coupling grooves 31.

A push part 33 is formed inwardly in a central part of an upper side of the front cap member 30 to prevent detachment of the pinch tap arm by pressing an end of the upper side of the pinch tap arm with a certain force when the pinch tap arm is coupled.

The rear top clip member 40 assembled on the rear side has, in an upper part, a top cover part 41 which covers a portion of an upper surface of a rear part of the adapter and includes a touch part 41a pressing down on a holder at an upper side of a side lock arm to prevent detachment of the side lock arm.

Hinge coupling grooves 42 coupled to the hinge pin for enabling free rotation are formed under a front side of the top cover part 41.

Also, detachable joining protrusions 43 which can be easily attached or detached by being pushed or pulled with a certain force are formed at another side kept at a predetermined distance from the hinge coupling grooves 42.

In addition, in order to enable the front cap member 30 and the rear top clip member 40 to be easily assembled to the arm-coupling adapter 20.

front cap hinge pins 25 may protrude from a lower part of the front side of the arm-coupling adapter 20, hinge and joining pins 26 may be formed at one end located a predetermined distance behind the front cap hinge pins 25, and detachable joining grooves 27 to which the detachable joining protrusions 32 can be elastically coupled may be formed in the upper surface of the rear side of the arm-coupling adapter 20.

The front cap member 30 may be coupled to the front side of the arm-coupling adapter 20 as the hinge coupling grooves 31 and the detachable joining grooves 32 respectively formed at front and rear sides of the front cap member 30 are coupled to the front cap hinge pins 25 and the hinge and joining pins 26.

In addition, the front cap member 30 may perform a swing motion by rotating about the front cap hinge pins 25 to prevent detachment of the pinch tap arm by stably pressing an end of the upper side of the pinch tap arm or to release the pinch tap arm.

In addition, on the rear side of the arm-coupling adapter 20, in a state where the hinge coupling grooves 42 and the detachable joining protrusions 43 formed respectively at front and rear sides of the rear top clip member 40 are coupled to the hinge and joining pins 26 and the detachable joining grooves 27 formed respectively at the front and rear side of the arm-coupling adapter 20.

the rear top clip member 40 may perform a swing motion by rotating about the hinge and joining pins 26 to prevent detachment of a "⊏"-shaped hook arm or a side lock arm by uniformly pressing an upper part of the arm when the arm is coupled or to release and separate the arm.

In particular, the hinge coupling groove 42 of the rear top clip member 40 and the detachable joining groove 32 of the front cap member 30 are doubly coupled to one hinge and joining pin 26.

Therefore, the hinge and joining pins 26 need to be configured to protrude to a length greater than that of the front cap hinge pins 25 so as to accommodate all the hinge coupling grooves 42 of the rear top clip member 40 and the detachable joining grooves 32 of the front cap member 30 at once.

Further, an auxiliary locking groove 26a may be additionally formed on an outer side of each of the hinge and joining pins 26 so as to provide a more secure binding force when the detachable joining grooves 32 are coupled.

An auxiliary locking protrusion 32a may be additionally formed at a side of each of the detachable joining grooves 32 corresponding to the auxiliary locking grooves 26a.

In addition, insertion grooves 20a are engraved in a vertical direction on both sides of the front side of the arm-coupling adapter 20, front locking protrusions 20b are formed immediately behind lower ends of the insertion grooves 20a, and rear locking protrusions 20c protruding further outward are formed behind the front locking protrusions 20b at a predetermined distance from the front locking protrusions 20b.

Therefore, after a narrow locking part T-1 protruding inward from a side of a top lock arm is inserted down into the insertion groove 20a, when the narrow locking part T-1 is pulled rearward, it is caught on the front locking protrusion 20b and thus prevented from being detached. On the other hand, a wide locking part T-2 on the opposite of the top lock arm is pulled downward without being inserted into the insertion groove 20a. Then, when the wide locking part T-2 is pulled rearward, a rear end of the wide locking part T-2 is caught on the rear locking protrusion 20c and thus prevented from being detached. In this way, the top lock arm can also be easily coupled.

Ultimately, the arm-coupling adapter assembly of the present disclosure is very useful because it can be selectively coupled not only to a "⊏"-shaped hook arm and a side lock arm but also to a pinch tap arm as well as a top lock arm as shown in the drawings.

| [Reference Numbers] | |
|---|---|
| A: arm-coupling adapter assembly | 10: center base cover |
| 20: arm-coupling adapter | 21: hinge |
| 22: hook arm assembling part | 23: arm pin assembling groove |
| 30: front cap member | 40: rear top clip member |

The invention claimed is:

1. A wiper blade adapter assembly comprising:
an arm-coupling adapter assembly coupled onto a base cover of a wiper blade by a hinge, and assembled with the base cover by installing, at an upper rear side of the arm-coupling adapter assembly, a rear top clip member configured to press and forcibly fix a portion of an upper surface of a wiper operating arm coupled to an arm-coupling adapter,
wherein the rear top clip member comprises;
a top cover part positioned in an upper part of the rear top clip member, wherein the top cover part covers a portion of an upper surface of a rear part of the arm-coupling adapter and comprises a touch part configured to press down on a holder of a side lock arm to prevent detachment of the side lock arm;

hinge coupling grooves positioned under a front side of the top cover part, wherein the hinge coupling grooves are coupled to hinge and joining pins of the arm-coupling adapter for enabling free rotation; and detachable joining protrusions positioned at another side a predetermined distance away from the hinge coupling grooves, wherein the detachable joining protrusions are be attached or detached by being pushed or pulled, and wherein the arm-coupling adapter comprises:

front cap hinge pins protruded from a lower part of a front side of the arm-coupling adapter;

the hinge and joining pins positioned at one end located a predetermined distance behind the front cap hinge pins; and detachable joining grooves to which the detachable joining protrusions are configured to be elastically coupled, wherein the detachable joining grooves are positioned in the upper surface of the rear side of the arm-coupling adapter.

2. The wiper blade adapter assembly of claim 1, wherein each of the hinge and joining pins comprises an auxiliary locking groove positioned on an outer side of the each of the hinge and joining pins, wherein the auxiliary locking groove is configured to provide a secure binding force when detachable joining grooves of a front cap member are coupled with the hinge and joining pins, wherein each of the detachable joining grooves of the front cap member comprises an auxiliary locking protrusion positioned at a side of the each of the detachable joining grooves of the front cap member, corresponding to the auxiliary locking grooves.

3. The wiper blade adapter assembly of claim 1, wherein the arm-coupling adapter further comprises:

insertion grooves, which are engraved in a vertical direction on both sides of the front side of the arm-coupling adapter;

front locking protrusions, which are positioned immediately behind lower ends of the insertion grooves; and rear locking protrusions, which are protruded outward and positioned behind the front locking protrusions at a predetermined distance from the front locking protrusions.

\* \* \* \* \*